(12) United States Patent
Sakakibara et al.

(10) Patent No.: US 9,315,076 B2
(45) Date of Patent: Apr. 19, 2016

(54) ASSEMBLY OF PNEUMATIC TIRE AND RIM

(71) Applicants: Kazuhiro Sakakibara, Osaka (JP); Atsushi Suzuki, Osaka (JP); Sanford Elliot Fowler-Hawkins, New York City, NY (US); Ippei Soma, Musashino (JP)

(72) Inventors: Kazuhiro Sakakibara, Osaka (JP); Atsushi Suzuki, Osaka (JP); Sanford Elliot Fowler-Hawkins, New York City, NY (US); Ippei Soma, Musashino (JP)

(73) Assignees: TOYO TIRE & RUBBER CO., LTD., Osaka-shi (JP); ACOUSTIC INNOVATIONS CO., LTD., Tokyo (JP)

( * ) Notice: Subject to any disclaimer, the term of this patent is extended or adjusted under 35 U.S.C. 154(b) by 220 days.

(21) Appl. No.: 13/952,260

(22) Filed: Jul. 26, 2013

(65) Prior Publication Data

US 2014/0034204 A1 Feb. 6, 2014

(30) Foreign Application Priority Data

Aug. 2, 2012 (JP) ................................. 2012-172030

(51) Int. Cl.
*B60C 5/00* (2006.01)
*B60C 19/00* (2006.01)

(52) U.S. Cl.
CPC ................. *B60C 19/002* (2013.04); *B60C 5/00* (2013.01); *B60C 5/002* (2013.01); *Y10T 152/10495* (2015.01)

(58) Field of Classification Search
CPC .......... B60C 5/00; B60C 5/002; B60C 19/002
See application file for complete search history.

(56) References Cited

U.S. PATENT DOCUMENTS

| 2006/0289100 A1 | 12/2006 | Fowler-Hawkins |
| 2009/0277553 A1 | 11/2009 | Tanno et al. |
| 2010/0012243 A1 | 1/2010 | Tanno et al. |
| 2011/0308704 A1 | 12/2011 | Sandstrom et al. |

FOREIGN PATENT DOCUMENTS

| EP | 870631 | * 10/1998 |
| JP | 2004-276809 A | 10/2004 |
| JP | 2005-001428 A | 1/2005 |
| JP | 2005-238888 A | 9/2005 |
| JP | 2005-297836 | * 10/2005 |
| JP | 2008-080846 A | 4/2008 |
| JP | 2010-149600 A | 7/2010 |
| JP | 2010-201997 A | 9/2010 |
| JP | 2011-006063 A | 1/2011 |
| JP | 2011-025832 A | 2/2011 |
| WO | 2009/124182 A1 | 10/2009 |

OTHER PUBLICATIONS

Machine translation of JP 2005-297836, 2005.*
Machine translation of EP 870631, 1998.*

* cited by examiner

*Primary Examiner* — Justin Fischer
(74) *Attorney, Agent, or Firm* — Westerman, Hattori, Daniels & Adrian, LLP (57) ABSTRACT

In an assembly of a pneumatic tire and a rim, in which a tire cavity is formed between the pneumatic tire and the rim by mounting the pneumatic tire on the rim, a noise suppressing body extending in a circumferential direction is disposed inside the tire cavity. The noise suppressing body includes a first sound absorbing material layer arranged apart from an inner surface of a tire tread part through a cavity and a second sound absorbing material layer disposed at the rim side of the first sound absorbing material layer and having lower air permeability than the first sound absorbing material layer.

7 Claims, 8 Drawing Sheets

ASSEMBLY OF PNEUMATIC TIRE AND RIM

CROSS-REFERENCE TO RELATED APPLICATIONS

This application is based upon and claims the benefit of priority from the prior Japanese Patent Application No. 2012-172030, filed on Aug. 2, 2012; the entire contents of which are incorporated herein by reference.

BACKGROUND

1. Technical Field

The disclosure relates to an assembly of a pneumatic tire and a rim, and more specifically relates to an assembly of a pneumatic tire and a rim having a noise suppressing body decreasing tire noises inside a tire cavity.

2. Related Art

In the related art, in order to decrease tire noises, it has been proposed to provide a noise suppressing body such as a sound absorbing material inside a tire cavity.

For example, JP-A-2008-080846 discloses a configuration where the sound absorbing material formed of flexible polyurethane foam is adhered to an inner surface of a tire. In this disclosure, the sound absorbing material is configured to have a first sound absorbing layer of the inner surface side of the tire and a second sound absorbing layer laminated on an inner peripheral side thereof and having lower density than the first sound absorbing layer, whereby achieving weight lightening of the sound absorbing material. However, in the sound absorbing material adhered to the inner surface of the tire, a sound absorbing effect is not expected to be sufficient with respect to sound waves generated by an input from a road surface and transmitted from a tread part into a tire cavity, and thereby a poor effect is expected in decreasing the tire noises.

In contrast, JP-A-2011-006063 discloses that a plurality of overlapped sound absorbing material layers is disposed into the tire cavity. In addition, WO 2009/124182 discloses that the sound absorbing material layers are disposed into the tire cavity, and a space between the sound absorbing material layers and the inner surface of the tire is filled with a spacer comprising a porous material that allows air flow therein. However, it is not disclosed that the sound absorbing material layers having different air permeability are combined to be disposed into the tire cavity and thereby multiple reflections are urged against the sound waves entering and passing through a noise suppressing body to enhance a sound suppressing effect.

On the other hand, JP-A-2005-238888 discloses that the sound absorbing material layer is disposed on an outer peripheral surface of a rim and a sliding layer formed of a resin film is disposed on the outer peripheral surface of the sound absorbing material layer. However, if the resin film having low air permeability is disposed on the outer peripheral side of the sound absorbing material layer, that is, on the tire side, most of the sound waves transmitted from the tread part into the tire cavity are reflected on the surface of the sliding layer, and thereby there are fewer components of the sound waves entering the sound absorbing material layer. Accordingly, the sound absorbing effect cannot be sufficiently demonstrated in the sound absorbing material layer.

SUMMARY

An embodiment is made in view of the above circumstances, and an object thereof is to provide an assembly of a pneumatic tire and a rim which can enhance a noise suppressing effect and decrease tire noises by urging multiple reflections inside a noise suppressing body against sound waves transmitted from a tread part into a tire cavity.

According to an embodiment, there is provided an assembly of a pneumatic tire and a rim, in which a tire cavity is formed between the pneumatic tire and the rim by mounting the pneumatic tire on the rim. The noise suppressing body extending in a circumferential direction of the tire is disposed inside the tire cavity. The noise suppressing body includes a first sound absorbing material layer arranged apart from an inner surface of a tread part of the pneumatic tire through a cavity and a second sound absorbing material layer disposed at the rim side of the first sound absorbing material layer and having lower air permeability than the first sound absorbing material layer.

DETAILED DESCRIPTION

As an aspect of the assembly of the pneumatic tire and the rim according to the present embodiment, the noise suppressing body may be disposed annularly along an outer peripheral surface of the rim and non-adhesively leaving a gap from the outer peripheral surface. In addition, as another aspect, the noise suppressing body may have a gas layer between the first sound absorbing material layer and the second sound absorbing material layer. As still another aspect, the noise suppressing body may have a third sound absorbing material layer disposed at the rim side of the second sound absorbing material layer and having lower air permeability than the second sound absorbing material layer. In addition, as still further another aspect, the noise suppressing body may have a third sound absorbing material layer disposed at the rim side of the second sound absorbing material layer and having higher air permeability than the second sound absorbing material layer. In this case, the noise suppressing body may further have a fourth sound absorbing material layer disposed at the rim side of the third sound absorbing material layer and having lower air permeability than the third sound absorbing material layer. Each of these aspects can be appropriately combined with each other.

According to the present embodiment, since the noise suppressing body formed from a plurality of sound absorbing material layers having different air permeability is disposed inside the tire cavity as described above, it is possible to enhance a noise suppressing effect by generating multiple reflections inside the noise suppressing body against sound waves transmitted from a tread part into the tire cavity, and thereby it is possible to effectively decrease tire noises.

Hereinafter, embodiments of the invention will be described with reference to the accompanying drawings.

Embodiment 1

Figure 1:
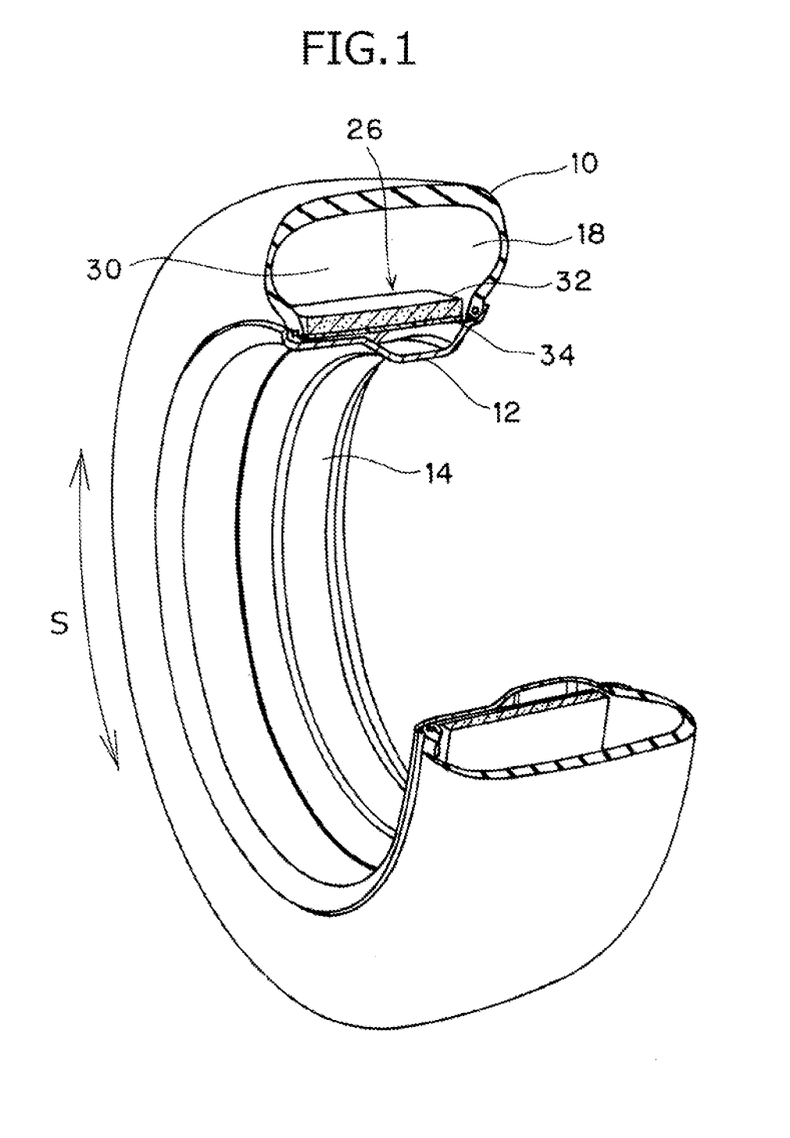
FIG. 1 is a partially cutaway perspective view of an assembly of a pneumatic tire and a rim according to Embodiment 1.
Figure 2:
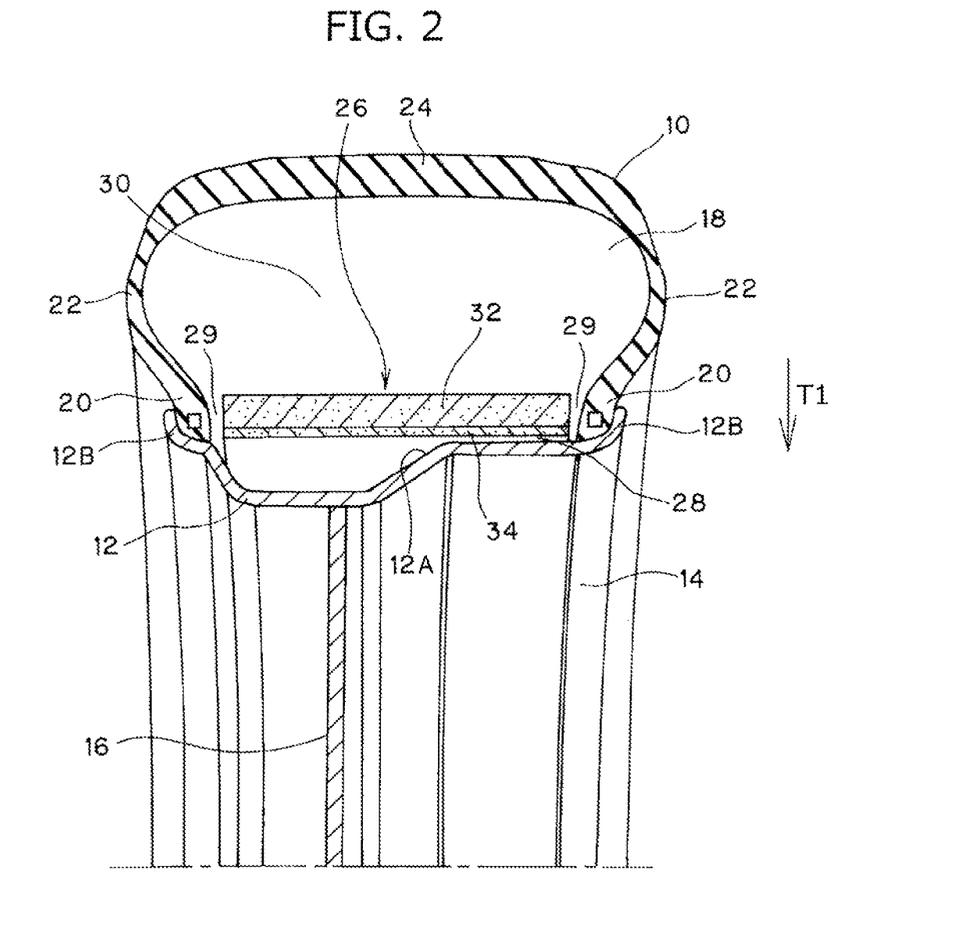
FIG. 2 is a cross-sectional view of the assembly.
Figure 3:
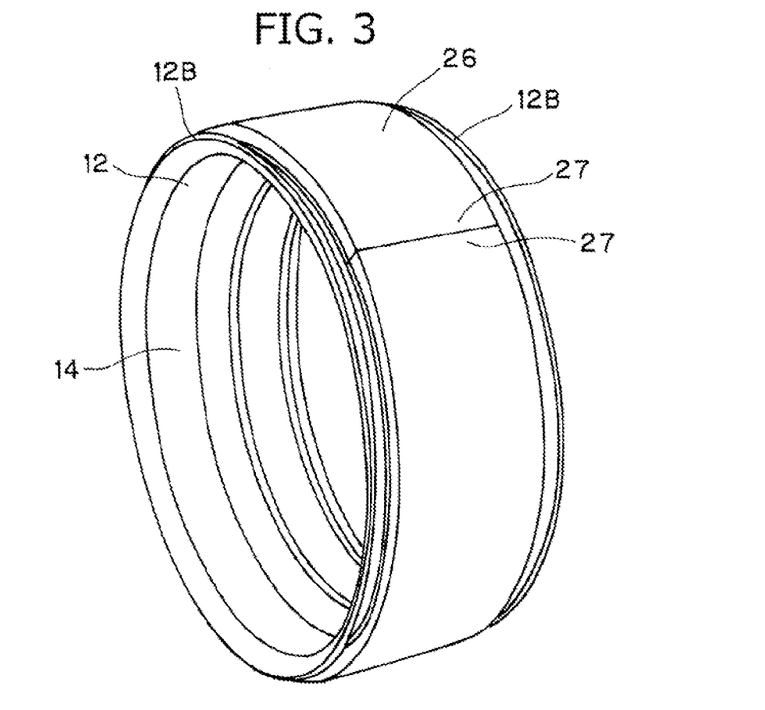
FIG. 3 is a perspective view of the rim on which a noise suppressing body is mounted in Embodiment 1.

FIGS. 1 to 4 relate to Embodiment 1. Referring to FIG. 1, the reference numeral 10 represents a pneumatic tire, and the reference numeral 12 represents a rim of a wheel 14. Referring to FIGS. 1 and 3, a disk 16 (refer to FIG. 2) of the wheel 14 is not illustrated, but the wheel 14 is a rigid part formed from the disk 16 and the rim 12 disposed at the outer periphery side thereof.

When the pneumatic tire 10 is fitted to the rim 12 to be assembled, an annular tire cavity 18 is formed as an air-filled cavity between the pneumatic tire 10 and the rim 12. A gas filling the tire cavity 18 includes, in addition to normal air, various types of gas generally filling the pneumatic tire, such as air having a changed oxygen partial pressure, and further inert gas such as nitrogen gas. However, herein, they will be sometimes simply referred to air.

The pneumatic tire 10 includes a pair of left and right bead parts 20 and 20, sidewall parts 22 and 22, and a tread part 24 connecting radially outward end portions of a pair of the left and right sidewall parts 22 and 22, and the bead part 20 is engaged with the rim 12.

A noise suppressing body 26 extending in a circumferential direction S of the tire is disposed inside the tire cavity 18. The noise suppressing body 26 is arranged at an inner periphery close to the rim 12 rather than the tread part 24 inside the tire cavity 18.

In detail, as illustrated in FIG. 3, the noise suppressing body 26 is annularly disposed along an outer peripheral surface of the rim 12 so as to surround the outer peripheral surface throughout the entire periphery. As illustrated in FIG. 2, the noise suppressing body 26 is disposed to be non-adhesive leaving a gap 28 from an outer peripheral surface 12A of the rim 12. As illustrated in FIG. 3, the noise suppressing body 26 is annularly formed by winding a belt-shaped material and joining end portions 27 and 27 thereof. The diameter of an inner peripheral surface of the noise suppressing body 26 is slightly larger than the outer peripheral surface 12A of the rim 12. Accordingly, the noise suppressing body 26 is in a state of being loosely fitted to the outer peripheral surface 12A, between left and right rim flanges 12B and 12B. Therefore, a gap 28 is formed as an air layer (gas layer) between the noise suppressing body 26 and the rim 12. The inner peripheral surface of the noise suppressing body 26 is located at the inner side T1 in the tire radial direction than the outer peripheral ends of the rim flanges 12B and 12B.

The noise suppressing body 26 is disposed to be non-adhesive with respect to not only the rim 12 but also the inner surface of the tire. In detail, the noise suppressing body 26 is disposed so as to cover the outer peripheral surface 12A of the rim 12 substantially throughout the entire width. However, the noise suppressing body 26 does not adhere to the left and right bead parts 20 and 20, and a gap 29 is disposed between the noise suppressing body 26 and both of the bead parts 20 and 20.

As illustrated in FIG. 2, the noise suppressing body 26 has a multiple layer structure (here, double layer structure) formed from a first sound absorbing material layer 32 arranged apart from the inner surface of the tread part 24 through a cavity 30, and a second sound absorbing material layer 34 laminated at the rim 12 side (that is, the inner periphery side) of the first sound absorbing material layer 32. Then, air permeability of the second sound absorbing material layer 34 of the inner periphery side (radially inward) is set to be lower than the air permeability of the first sound absorbing material layer 32 of the outer periphery side (radially outward).

Figure 4:
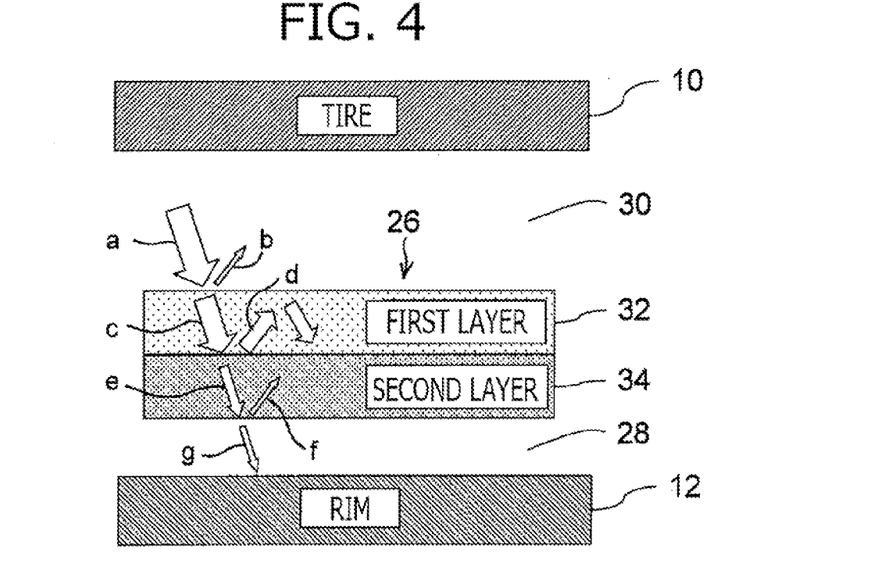
FIG. 4 is a conceptual diagram illustrating a configuration of the noise suppressing body in Embodiment 1.

FIG. 4 is a view schematically illustrating a configuration of the noise suppressing body 26 in Embodiment 1. The first sound absorbing material layer 32 (in the drawing, simply indicated by the "first layer") having high air permeability is arranged at the tire side, and the second sound absorbing material layer 34 (in the drawing, simply indicated by the "second layer") having low air permeability is arranged at the rim side. In this example, a gap forming the air layer is not disposed between the first sound absorbing material layer 32 and the second sound absorbing material layer 34. That is, the first sound absorbing material layer 32 and the second sound absorbing material layer 34 are stacked without any gap, and an interface (interlayer) between both of them is adhered.

A material of the first sound absorbing material layer 32 and the second sound absorbing material layer 34, without being particularly limited thereto, includes fiber structure materials such as non-woven, woven, knitted fabrics and mesh materials, porous materials (sponge) such as various types of resin foam like polyurethane foam, and synthetic resin or rubber film, sheet and plate.

With regard to the air permeability and the thickness of the first sound absorbing material layer 32 and the second senna absorbing material layer 34, although not particularly limited thereto, it is preferable that the air permeability of the first sound absorbing material layer 32 be higher than 50 $(cm^3/cm^2 \cdot sec)$ and equal to or lower than 120 $(cm^3/cm^2 \cdot sec)$, the air permeability of the second sound absorbing material layer 34 be from 0 $(cm^3/cm^2 \cdot sec)$ to 50 $(cm^3/cm^2 \cdot sec)$, and the entire air permeability be equal to or less than 120 $(cm^3/cm^2 \cdot sec)$. In addition, it is preferable that the thickness of the first sound absorbing material layer 32 be 20 mm or less, the thickness of the second sound absorbing material layer 34 be 20 mm or less, and the entire thickness be from 5 mm to 20 mm. If the thickness of the sound absorbing material layers 32 and 34 is too large, weight increase may be considerable or an assembling work of the pneumatic tire 10 may be influenced.

Here, in order to measure the air permeability, a value is used in which ventilation resistance R measured at room temperature (23° C.) by using a "KES-F8-AP1 Air Permeability Tester" manufactured by Rate Tech Co., Ltd. is converted to air permeability Q, based on the definition of JIS L1096 Air Permeability A method (Frazier type method). In the JIS Frazier type method, the air permeability Q $(cm^3/cm^2 \cdot sec)$ is defined by setting a flow rate passing therethrough as Q, when it becomes a pressure difference of 125 Pa. In the KES-F8-AP1 Air Permeability Tester, a constant flow rate V $(m^3/m^2 \cdot sec)$ is passed, a pressure difference $\Delta P$ (kPa) at that time is measured, and the ventilation resistance R $(kPa \cdot sec/m)$ is obtained from $R = \Delta P/V$. Since the relationship between the air permeability Q and the ventilation resistance R is $Q = 12.5/R$ (diameter of a ventilation hole is 2.828 cm), using this relational expression, the air permeability can be calculated based on the JIS Frasier type method.

If there is provided the noise suppressing body 26 according to Embodiment 1, the sound waves generated by the input from the road surface and transmitted from the tread part 24 into the tire cavity 18 are decreased in the following manner, when being transmitted to the rim 12.

As illustrated in FIG. 4, a sound wave (a) transmitted from the tread part 24 is incident on the noise suppressing body 26 from the cavity 30 which is the air layer. Since the first sound absorbing material layer 32 on the surface of the noise suppressing body 26 has high air permeability, there are fewer components becoming a reflection wave (b) on the surface. Therefore, it is possible to increase the components entering the first sound absorbing material layer 32. An entry wave (c) entering the first sound absorbing material layer 32 travels while being attenuated in such a manner that a portion thereof is changed from acoustic energy to thermal energy (hereinafter, simply referred to as thermal conversion) inside the first sound absorbing material layer 32, and reaches an interface between the first sound absorbing material layer 32 and the second sound absorbing material layer 24. In the interface, since the air permeability of the second sound absorbing material layer 34 is low, there are many components becoming the reflection wave (d). A reflection wave (d) travels while a portion thereof is attenuated by the thermal conversion inside the first sound absorbing material layer 32, and is attenuated by repeating the further reflection on the surface of the noise suppressing body 26 and radiation to the cavity 30. On the other hand, an entry wave (e) enters the second sound absorbing material layer 34 from the interface between the first sound absorbing material layer 32 and the second sound absorbing material layer 34. The entry wave (e) travels while a portion thereof is attenuated by the thermal conversion inside the second sound absorbing material layer 34, and reaches the interface between the second sound absorbing material layer 34 and the gap 28 which is the air layer. In the interface, the entry wave (e) becomes a reflection wave (f) and a radiation wave (g) to the gap 28, and the reflection wave (f) travels while being attenuated by the thermal conversion inside the second sound absorbing material layer 34. On the other hand, the radiation wave (g) is transmitted to the rim 12 through the gap 28.

According to Embodiment 1 as described above, since the air permeability of the first sound absorbing material layer 32 which is the first layer is high, it is possible to urge the sound wave to enter the noise suppressing body 26 with less reflection on the surface of the noise suppressing body 26. In addition, since the air permeability of the second sound absorbing material layer 34 which is the second layer is lower than that of the first sound absorbing material layer 32, reflections occur on the interface between both of the layers, and a sound absorbing effect is enhanced with the aid of the multiple reflections. In this manner, it is possible to urge the reflection of the sound wave inside the noise suppressing body 26. Accordingly, it is possible to enhance the noise suppressing effect with respect to the sound wave transmitted from the tread part 24 into the tire cavity 18, and it is possible to considerably decrease tire noises.

In addition, according to Embodiment 1, the noise suppressing body 26 is disposed to be non-adhesive with respect to the outer peripheral surface 12A of the rim 12. Accordingly, the noise suppressing body 26 is separated from the outer peripheral surface 12A of the rim 12 due to the centrifugal force, during the rotation of the pneumatic tire 10, and a predetermined gap 28 is easily secured throughout the entire periphery. Therefore, it is possible to enhance the noise suppressing effect. The noise suppressing body 26 may be disposed so as to slide on the outer peripheral surface 12A of the rim 12 or may be disposed so as to be rotated together with the rim 12.

In the present embodiment, the targeted tire noise is a noise called a road noise, which is generated inside a vehicle in such a manner that the tire receives an input from a road surface when the vehicle travels on the road surface. If the vehicle travels on a rough road surface or climbs over a joint of the road surface, the noise can be significantly felt. This road noise is one of noises in which the tire is involved. In detail, irregularities of the road, surface are input to the tire to vibrate air inside the tire, and the vibration is transmitted to the vehicle body via the rim through the vehicle shaft and the suspension, whereby finally causing the noise in the vehicle. In particular, it has been known that cavity resonance due to the cavity inside the tire is involved in one which is generated around 200 Hz to 250 Hz of the noises in the vehicle. The present embodiment which targets the noise which passes through the cavity 18 of the tire and is transmitted to the rim 12 most remarkably contributes to a solution for the noise clue to the cavity resonance, but the embodiment is not limited thereto.

Embodiment 2

Figure 5:
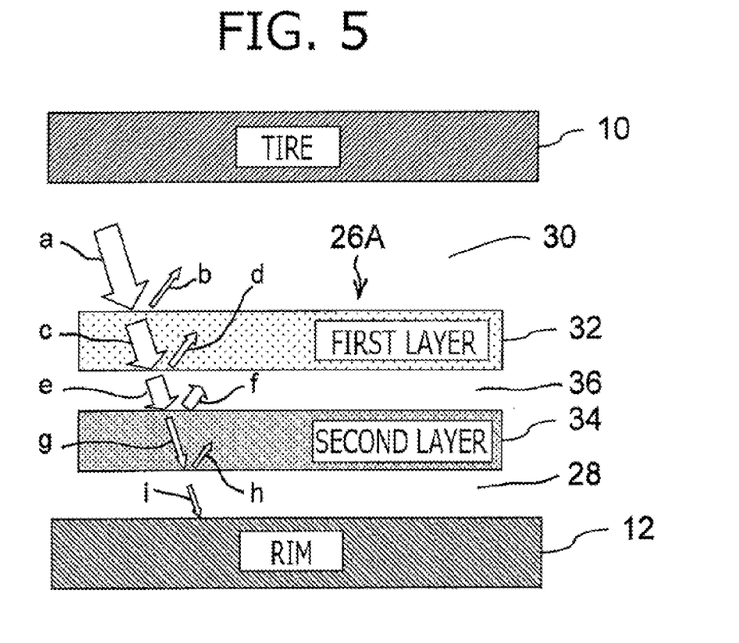
FIG. 5 is a conceptual diagram illustrating a configuration of a noise suppressing body in Embodiment 2.

FIG. 5 illustrates a configuration of a noise suppressing body 26A according to Embodiment 2. The noise suppressing body 26A of Embodiment 2 is different from the noise suppressing body 26 of Embodiment 1 in that an air layer (gas layer) 36 is provided between the first sound absorbing material layer 32 and the second sound absorbing material layer 34.

That is, in Embodiment 2, the first sound absorbing material layer 32 and the second sound absorbing material layer 34 are laminated leaving a gap which is the air layer 36. The air layer 36 may be a gap formed by arranging a spacer between the first sound absorbing material layer 32 and the second sound absorbing material layer 34, or may be a minute gap formed between both of them in such a manner that an interface (interlayer) between the first sound absorbing material layer 32 and the second sound absorbing material layer 34 is non-adhesive. In a non-adhesive case of the latter, the first-sound absorbing material layer 32 and the second sound absorbing material layer 34 may be adhered only in the edge portions of the noise suppressing body 26 (for example, both end portions in the tire width direction), and both of them may be integrated with each other. Then, the air layer 36 having a minute gap; may be formed in the interlayer by making the other portions non-adhesive.

In the noise suppressing body 26A according to Embodiment 2, as illustrated in FIG. 5, a sound wave (a) which is transmitted from the tread part 24 and is incident on the noise suppressing body 26A from the cavity 30 has fewer components becoming a reflection wave (b) on the surface, since the air permeability is high in the first sound absorbing material layer 32 on the surface of the noise suppressing body 26A. An entry wave (c) entering the first sound absorbing material layer 32 travels while a portion thereof is attenuated by the thermal conversion inside the first sound absorbing material layer 32, and becomes a reflection wave (d) in the interface with the air layer 36 and a radiation wave (e) to the air layer 36. The reflection wave (d) travels while being attenuated by the thermal conversion inside the first sound absorbing material layer 32. On the other hand, the radiation wave (e) reaches the interface with the second sound absorbing material layer 34, but has many components becoming a reflection wave (f)

in the interface due to the low air permeability of the second sound absorbing material layer 34. The reflection wave (f) is reflected on the interface with the first sound absorbing material layer 32, or enters the inside of the first sound absorbing material layer 32 to repeat the multiple reflections and to be attenuated. The entry wave (g) entering the second sound absorbing material layer 34 from the air layer 36 travels while a portion thereof is attenuated by the thermal conversion inside the second sound absorbing material layer 34, and reaches the interface between the second sound absorbing material layer 34 and the gap 28 which is the air layer. In the interface, the entry wave (g) becomes a reflection wave (h) and a radiation wave (i) to the gap 28. The reflection wave (h) travels while being attenuated by the thermal conversion inside the second sound absorbing material layer 34. On the other hand, the radiation wave (i) is transmitted to the rim 12 through the gap 28.

In this manner, according to Embodiment 2, the air layer 36 is disposed between the first sound absorbing material layer 32 and the second sound absorbing material layer 34. Accordingly, it is possible to further urge the multiple reflections inside the noise suppressing body 26 and it is possible to enhance the sound absorbing effect. Embodiment 2 is the same as Embodiment 1 in the other configurations and advantageous effects, and the description will not be repeated.

Embodiment 3

Figure 6:
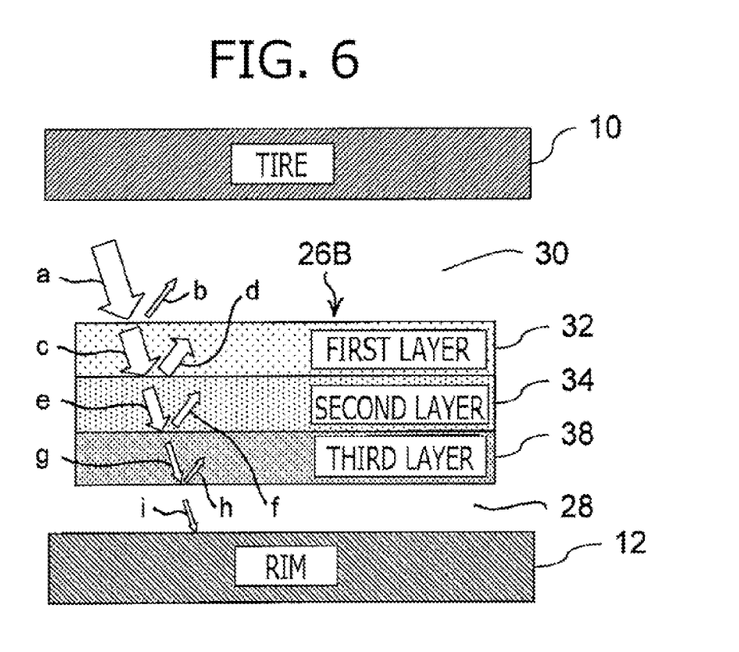
FIG. 6 is a conceptual diagram illustrating a configuration of a noise suppressing body in Embodiment 3.

FIG. 6 illustrates a configuration of a noise suppressing body 26B according to Embodiment 3. The noise suppressing body 26B in Embodiment 3 is different from the noise suppressing body 26 in Embodiment 1 in that there is provided a third sound absorbing material layer 38 which is laminated on the rim side of the second sound absorbing material layer 34 and has lower air permeability than that of the second sound absorbing material layer 34.

That is, the noise suppressing body 26B in Embodiment 3 has a triple layer structure with the first sound absorbing material layer 32, the second sound absorbing material layer 34 and the third sound absorbing material layer 38, and is set such that the respective air permeability of the sound absorbing material layers 32, 34 and 38 is decreased stepwise starting from the tire side (radially outward). In addition, in the noise suppressing body 26B in Embodiment 3, a gap which is the air layer is not disposed in between the respective sound absorbing material layers 32, 34 and 38, but the respective layers are stacked without any gap, and an interface (interlayer) is adhered therebetween.

As the material for the third sound absorbing material layer 38, the same material as used for the first and second sound absorbing material layers 32 and 34 can be used. With regard to the relationship of the air permeability and the thickness, although not particularly limited thereto, it is preferable that the air permeability of the first sound absorbing material layer 32 be higher than 50 (cm$^3$/cm$^2$·sec) and equal to or lower than 120 (cm$^3$/cm$^2$·sec), the air permeability of the second sound absorbing material layer 34 be higher than 20 (cm$^3$/cm$^2$·sec) and equal to or lower than 50 (cm$^3$/cm$^2$·sec), the air permeability of the third sound absorbing material layer 33 be from 0 (cm$^3$/cm$^2$·sec) to 20 (cm$^3$/cm$^2$·sec), and the entire air permeability be equal to or lower than 120 (cm$^3$/cm$^2$·sec). In addition, it is preferable that the respective thickness of the first, second and third sound absorbing material layers 32, 34 and 38 be 20 mm or less, and the entire thickness be from 5 mm to 20 mm.

In the noise suppressing body 26B according to Embodiment 3, as illustrated in FIG. 6, a sound wave (a) which is transmitted from the tread part 24 and is incident on the noise suppressing body 26B from the cavity 30 has fewer components becoming a reflection wave (b) on the surface of the noise suppressing body 26B. An entry wave (c) entering the first sound absorbing material layer 32 travels while a portion thereof is attenuated by the thermal conversion inside the first sound absorbing material layer 32, and reaches the interface with the second sound absorbing material layer 34. In the interface, since the air permeability of the second sound absorbing material layer 34 is low, there are many components becoming a reflection wave (d). The reflection wave (d) travels while a portion thereof is attenuated by the thermal conversion inside the first sound absorbing material layer 32, and is further repeatedly reflected on the surface of the noise suppressing body 26B, and is repeatedly radiated to the cavity 30 to be attenuated. On the other hand, an entry wave (e) enters the second sound absorbing material layer 34 from the interface between the first sound absorbing material layer 32 and the second sound absorbing material layer 34. The entry wave (e) travels while a portion thereof is attenuated by the thermal conversion inside the second sound absorbing material layer 34, and reaches the interface between the second sound absorbing material layer 34 and the third sound absorbing material layer 38. In the interface, since the air permeability of the third sound absorbing material layer 38 is low, there are many components becoming a reflection wave (f). The reflection wave (f) travels while a portion thereof is attenuated by the thermal conversion inside the second sound absorbing material layer 34, and is further repeatedly reflected on the interface with the first sound absorbing material layer 32 and enters the first sound absorbing material layer 32 to be attenuated. On the other hand, an entry wave (g) enters the third sound absorbing material layer 38 from the interface between the second sound absorbing material layer 34 and the third sound absorbing material layer 38. The entry wave (g) travels while a portion thereof is attenuated by the thermal conversion inside the third sound absorbing material layer 38, and reaches the interface between the third sound absorbing material layer 38 and the gap 23 which is the air layer. In the interface, the entry wave (g) becomes a reflection wave (h) and a radiation wave (i) to the gap 28, and the reflection wave (h) travels while being attenuated by the thermal conversion inside the third sound absorbing material layer 38. On the other hand, the radiation wave (i) is transmitted to the rim 12 through the gap 28.

In this manner, according to Embodiment 3, by providing the third sound absorbing material layer 38, it is possible to cause the further stepwise multiple reflections inside the noise suppressing body 26B compared to Embodiment 1, and thereby it is possible to enhance the sound absorbing effect. Embodiment 3 is the same as Embodiment 1 in the other configurations and advantageous effects, and the description will not be repeated.

Embodiment 4

Figure 7:
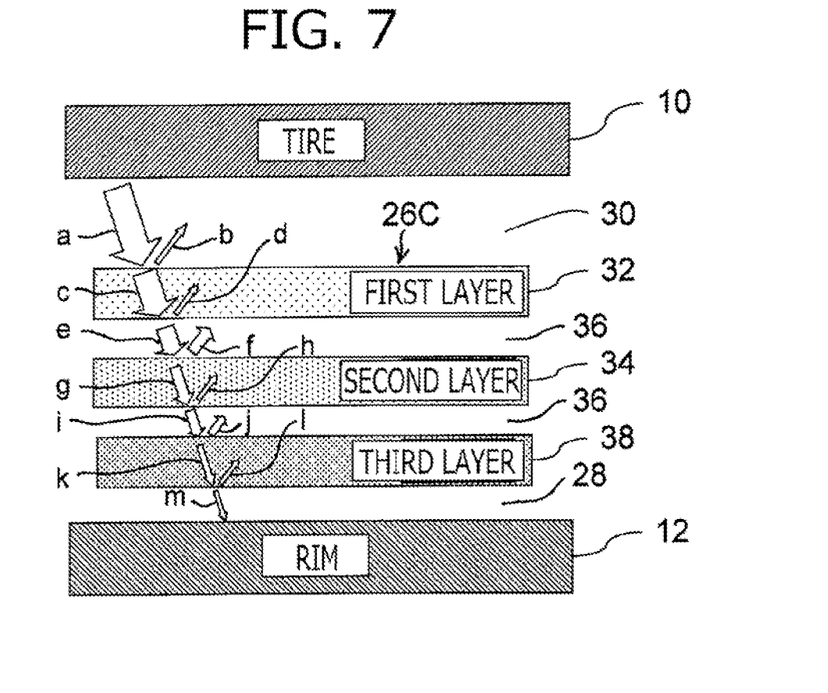
FIG. 7 is a conceptual diagram illustrating a configuration of a noise suppressing body in Embodiment 4.

FIG. 7 illustrates a configuration of a noise suppressing body 26C according to Embodiment 4. The noise suppressing body 26C in Embodiment 4 is different from the noise suppressing body 26B in Embodiment 3 in that air layers (gas layers) 36 are provided between the first sound absorbing material layer 32 and the second sound absorbing material layer 34, and between the second sound absorbing material layer 34 and the third sound absorbing material layer 38.

That is, in Embodiment 4, the first sound absorbing material layer 32, the second sound absorbing material layer 34 and the third sound absorbing material layer 38 are laminated leaving gaps which are the air layers 36 in each interlayer. As the configuration of the air layers 36, the came configuration as that of Embodiment 2 can be adopted.

In the noise suppressing body 26C according to Embodiment 4, as illustrated in FIG. 7, a sound wave (a) which is transmitted from the tread part 24 and is incident on the noise suppressing body 26C from the cavity 30 has fewer components becoming a reflection wave (b) on the surface of the noise suppressing body 26C. An entry wave (c) entering the first sound absorbing material layer 32 travels while a portion thereof is attenuated by the thermal conversion inside the first sound absorbing material layer 32, and becomes a reflection wave (d) in the interface with the air layer 36 and a radiation wave (e) to the air layer 36. The reflection wave (d) travels while being attenuated by the thermal conversion inside the first sound absorbing material layer 32. On the other hand, the radiation wave (e) reaches the interface with the second sound absorbing material layer 34, but has many components becoming a reflection wave (f) in the interface due to the low air permeability of the second sound absorbing material layer 34. The reflection wave (f) is reflected on the interface with the first sound absorbing material layer 32, or enters the inside of the first sound absorbing material layer 32 to repeat the multiple reflections and to be attenuated. The entry wave (g) entering the second sound absorbing material layer 34 from the air layer 36 travels while a portion thereof is attenuated by the thermal conversion inside the second sound absorbing material layer 34, and becomes a reflection wave (h) in the interface with the air layer 36 and a radiation wave (i) to the air layer 36. The reflection wave (h) travels while being attenuated by the thermal conversion inside the second sound absorbing material layer 34. On the other hand, the radiation wave (i) reaches the interface with the third sound absorbing material layer 38, but has many components becoming a reflection wave (j) in the interface due to the low permeability of the third sound absorbing material layer 38. The reflection wave (j) is reflected on the interface with the second sound absorbing material layer 34, or enters the inside of the second sound absorbing material layer 34 to repeat the multiple reflections and to be attenuated. An entry wave (k) entering the third sound absorbing material layer 38 from the air layer 36 travels while a portion thereof is attenuated by the thermal conversion inside the third sound absorbing material layer 38, and reaches the interface between the third sound absorbing material layer 38 and the gap 28 which is the air layer. In the interface, the entry wave (k) becomes a reflection wave (l) and a radiation wave (m) to the gap 28. The reflection wave (l) travels while being attenuated by the thermal conversion inside the third sound absorbing material layer 38. On the other hand, the radiation wave (m) is transmitted to the rim 12 through the gap 28.

In this manner, according to Embodiment 4, by providing the air layers 36 in the respective sound absorbing material layers 32, 34 and 38, it is possible to cause the further stepwise multiple reflections inside the noise suppressing body 26C compared to Embodiment 3, and thereby it is possible to enhance the sound absorbing effect. Embodiment 4 is the same as Embodiment 3 in the other configurations and advantageous effects, and the description will not be repeated.

Embodiment 5

Figure 8:
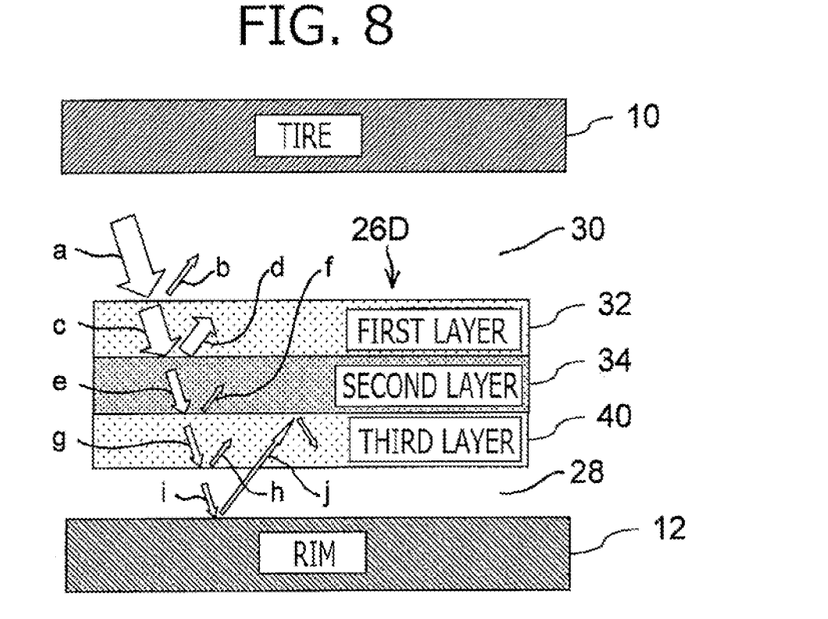
FIG. 8 is a conceptual diagram illustrating a configuration of a noise suppressing body in Embodiment 5.

FIG. 8 illustrates a configuration of a noise suppressing body 26D according to Embodiment 5. The noise suppressing body 26D in Embodiment 5 is different from the noise suppressing body 26 in Embodiment 1 in that there is provided a third sound absorbing material layer 40 which is laminated on the rim side of the second sound absorbing material layer 34, and has higher air permeability than the second sound absorbing material layer 34.

That is, the noise suppressing body 26D in Embodiment 5 has a triple layer structure with the first sound absorbing material layer 32, the second sound absorbing material layer 34 and the third sound absorbing material layer 40, and has a configuration where the second sound absorbing material layer 34 having low air permeability is interposed between the first sound absorbing material layer 32 and the third sound absorbing material layer 40 which have high air permeability. In addition, in the noise suppressing body 26D in Embodiment 5, a gap is not disposed in the respective sound absorbing; material layers 32, 34 and 40, but the respective layers are stacked without any gap and an interface (interlayer) is adhered therebetween. Similarly to Embodiment 4, the respective sound absorbing material layers 32, 34 and 40 may be laminated leaving a gap which is the air layer therebetween.

As the material for the third sound absorbing material layer 40, the same material as used for the first and second sound absorbing material layers 32 and 34 can be used. With regard to the relationship of the air permeability and the thickness, although not particularly limited thereto, it is preferable that the air permeability of the first sound absorbing material layer 32 and the third sound absorbing material layer 40 be higher than 50 ($cm^3/cm^2$·sec) and equal to or lower than 120 ($cm^3/cm^2$·sec), the air permeability of the second sound absorbing material layer 34 be from 0 ($cm^3/cm^2$·sec) to 50 ($cm^3/cm^2$·sec), and the entire air permeability be equal to or lower than 120 ($cm^3/cm^2$·sec). In addition, it is preferable that the respective thickness of the first, second and third sound absorbing material layers 32, 34 and 40 be 20 mm or less, and the entire thickness be from 5 mm to 20 mm.

In the noise suppressing body 26D according to Embodiment 5, as illustrated in FIG. 8, a sound wave (a) which is transmitted from the tread part 24 and is incident on the noise suppressing body 26D from the cavity 30 has fewer components becoming a reflection wave (b) on the surface of the noise suppressing body 26D. An entry wave (c) entering the first sound absorbing material layer 32 travels while a portion thereof is attenuated by the thermal conversion inside the first sound absorbing material layer 32, and reaches the interface with the second sound absorbing material layer 34. In the interface, since the air permeability of the second sound absorbing material layer 34 is low, there are many components becoming a reflection wave (d). The reflection wave (d) travels while a portion thereof is attenuated by the thermal conversion inside the first sound absorbing material layer 32, and is further repeatedly reflected on the surface of the noise suppressing body 26D, and is repeatedly radiated to the cavity 30 to be attenuated. On the other hand, an entry wave (e) enters the second sound absorbing material layer 34 from the interface between the first sound absorbing material layer 32 and the second sound absorbing material layer 34. The entry wave (e) travels while a portion thereof is attenuated by the thermal conversion inside the second sound absorbing material layer 34, and reaches the interface between the second sound absorbing material layer 34 and the third sound absorbing material layer 40. In the interface, since the air permeability of the third sound absorbing material layer 40 is high, there is fewer components becoming a reflection wave (f). An entry wave (g) entering the third sound absorbing material layer 40 travels while a portion thereof is attenuated by the thermal conversion inside the third sound absorbing material layer 40, and reaches the interface between the third sound absorbing material layer 40 and the gap 28 which is the air layer. In the interface, the entry wave (g) becomes a reflection wave (h) and a radiation wave (i) to the gap 28, and the reflection wave (h) travels while being attenuated by the thermal conversion inside the third sound absorbing material layer 40. On the other hand, the radiation wave (i) is transmitted to the rim 12 through the gap 28. A reflection wave (j) reflected on the rim 12 enters the third sound absorbing material layer 40 having high air permeability to be attenuated, and is further attenuated by being reflected on the interface between the third sound absorbing material layer 40 and the second sound absorbing material layer 34.

In this manner, according to Embodiment 5, by providing the third sound absorbing material layer 40 having high air permeability at the rim 12 side of the second sound absorbing material layer 34, it is possible that the sound wave passing through the noise suppressing body 26D and secondarily reflected on the rim 12 is attenuated by the multiple reflections inside the noise suppressing body 26D, and thereby it is possible to enhance the sound absorbing effect, compared to Embodiment 1. Embodiment 5 is the same as Embodiment 1 in the other configurations and advantageous effects, and the description will not be repeated.

Embodiment 6

Figure 9:
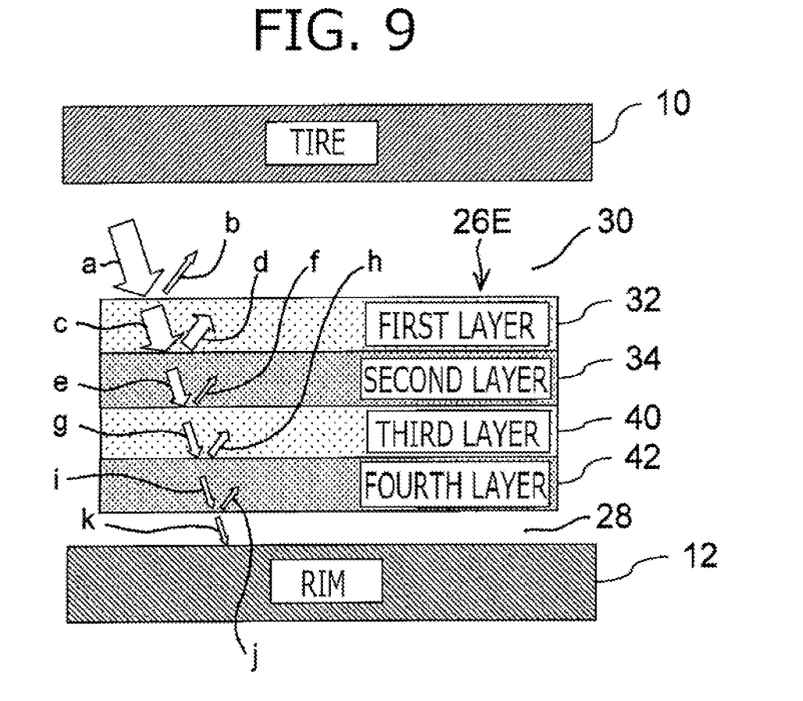
FIG. 9 is a conceptual diagram illustrating a configuration of a noise suppressing body in Embodiment 6.

FIG. 9 illustrates a configuration of a noise suppressing body 26E according to Embodiment 6. The noise suppressing body 26E of Embodiment 6 is different from the noise suppressing body 26D of Embodiment 5 in that there is provided a fourth sound absorbing material layer 42 laminated on the rim side of the third sound absorbing material layer 40 and having lower air permeability than the third sound absorbing material layer 40.

That is, the noise suppressing body 26E in Embodiment 6 has a quadruple layer structure with the first sound absorbing material layer 32, the second sound absorbing material layer 34, the third sound absorbing material layer 40 and the fourth sound absorbing material layer 42, and has a configuration where the noise suppressing body 26 in Embodiment 1 is stacked in double layers. In addition, in the noise suppressing body 26E in Embodiment 6, a gap which is the air layer is not disposed in between the respective sound absorbing material layers 32, 34, 40 and 42, but the respective layers 32, 34, 40 and 42 may be laminated leaving a gap which is the air layer therebetween.

As the material for the fourth sound absorbing material layer 42, the same material as used for the first and second sound absorbing material layers 32 and 34 can be used. With regard to the relationship of the air permeability and the thickness, although not particularly limited thereto, it is preferable that the air permeability of the first sound absorbing material layer 32 and the third sound absorbing material layer 40 be higher than 50 ($cm^3/cm^2 \cdot sec$) and equal to or lower than 120 ($cm^3/cm^2 \cdot sec$), the air permeability at the second sound absorbing material layer 34 and the fourth sound absorbing material layer 42 be from 0 ($cm^3/cm^2 \cdot sec$) to 50 ($cm^3/cm^2 \cdot sec$), and the entire air permeability be equal to or lower than 120 ($cm^3/cm^2 \cdot sec$). In addition, it is preferable that the respective thickness of the first, second, third and fourth sound absorbing material layers 32, 34, 40 and 42 be 20 mm or less, and the entire thickness be from 5 mm to 20 mm.

In the noise suppressing body 26E according to Embodiment 6, as illustrated in FIG. 9, a sound wave (a) which is transmitted from the tread part 24 and is incident on the noise suppressing body 26E from the cavity 30 has fewer components becoming a reflection wave (b) on the surface of the noise suppressing body 26E. An entry wave (c) entering the first sound absorbing material layer 32 travels while a portion thereof is attenuated by the thermal conversion inside the first sound absorbing material layer 32, and reaches the interface with the second sound absorbing material layer 34. In the interface, since the air permeability of the second sound absorbing material layer 34 is low, there are many components becoming a reflection wave (d). The reflection wave (d) travels while a portion thereof is attenuated by the thermal conversion inside the first sound absorbing material layer 32, and is further repeatedly reflected on the surface of the noise suppressing body 26E, and is repeatedly radiated to the cavity 80 to be attenuated. On the other hand, an entry wave (e) enters the second sound absorbing material layer 34 from the interface between the first sound absorbing material layer 22 and the second sound absorbing material layer 34. The entry wave (e) travels while a portion thereof is attenuated by the thermal conversion inside the second sound absorbing material layer 34, and reaches the interface between the second sound absorbing material layer 34 and the third sound absorbing material layer 40. In the interface, since the air permeability of the third sound absorbing material layer 40 is high, there is fewer components becoming a reflection wave (f). An entry wave (g) entering the third sound absorbing material layer 40 from the interface travels while a portion thereof is attenuated by the thermal conversion inside the third sound absorbing material layer 40, and reaches the interface between the third sound absorbing material layer 40 and the fourth sound absorbing material layer 42. In the interface, since the air permeability of the fourth sound absorbing material layer 42 is low, there are many components becoming a reflection wave (h). The reflection wave (h) travels while a portion thereof is attenuated by the thermal conversion inside the third sound absorbing material layer 40, and is further repeatedly reflected on the interface with the second sound absorbing material layer 34, and enters the second sound absorbing material layer 34 to be attenuated. On the other hand, an entry wave (i) entering the fourth sound absorbing material layer 42 travels while a portion thereof is attenuated by the thermal conversion inside the fourth sound absorbing material layer 42, and reaches the interface between the fourth sound absorbing material layer 42 and the gap 28 which is the air layer. In the interface, the entry wave (i) becomes a reflection wave (j) and a radiation wave (k) to the gap 28, and the reflection wave (j) travels while being attenuated by the thermal conversion inside the fourth sound absorbing material layer 42. On the other hand, the radiation wave (k) is transmitted to the rim 12 through the gap 28.

In this manner, according to Embodiment 6, by providing the noise suppressing body 26 in Embodiment 1 in double layers, it is possible to further urge the multiple reflections inside the noise suppressing body 26E, and thereby it is possible to enhance the sound absorbing effect. Embodiment 6 is the same as Embodiment 1 in the other configurations and advantageous effects, and the description will not be repeated.

Embodiment 7

Figure 10:
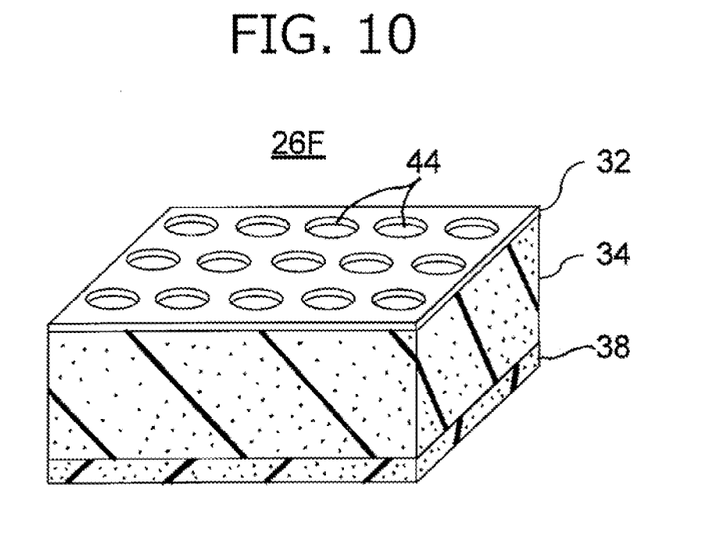
FIG. 10 is a perspective cress-sectional view of a noise suppressing body in Embodiment 7.

FIG. 10 illustrates a configuration of a noise suppressing body 26F according to Embodiment 7. The noise suppressing body 26F in Embodiment 2 is a modification example of the noise suppressing body 26B in Embodiment 3 illustrated in FIG. 6. In this example, a resin film subjected to a perforating process is used for the first sound absorbing material layer 32 whose air permeability is the highest, and fiber structure materials such as non-woven fabrics or porous materials are used for the second sound absorbing material layer 34 and the third sound absorbing material layer 38 which have the lower air permeability than the first sound absorbing material layer 32.

As illustrated in FIG. 10, multiple small holes 44 are disposed in the first sound absorbing material layer 32, and the air permeability is controlled by disposing the small holes 44. Such small holes 44 are sufficiently small for a ventilation hole when measuring the air permeability. Although not particularly limited thereto, it is preferable to have the diameter of 2 mm or less.

If there is provided such a film subjected to the perforating process, it is possible to enhance the air permeability while ensuring strength. Accordingly, in a case where the non-woven fabrics or porous materials which have relatively high air permeability and weak strength are used as the second sound absorbing material layer 34, it is possible to provide a function as a reinforcement layer protecting the second sound absorbing material layer 34. That is, while protecting the second sound absorbing material layer 34 whose strength is weak, the function as the first sound absorbing material layer 32 whose air permeability is high can be exerted. Embodiment 7 is the same as Embodiment 3 in the other configurations and advantageous effects, and the description will not be repeated.

Other Embodiments

In the above-described embodiments, the noise suppressing body is disposed annularly along the outer peripheral surface of the rim throughout the periphery, but the noise suppressing body may not necessarily be disposed throughout the periphery. In addition, in the above-described embodiments, the noise suppressing body is formed in a relatively flat plate shape, but the noise suppressing body may be formed in a dome shape in a meridian cross-sectional view, in which the central portion in the width direction of the tire bulges radially outward of the tire. In addition, although not exemplified one by one, various modifications can be made without departing from the spirit of the invention.

Examples

Figure 11:
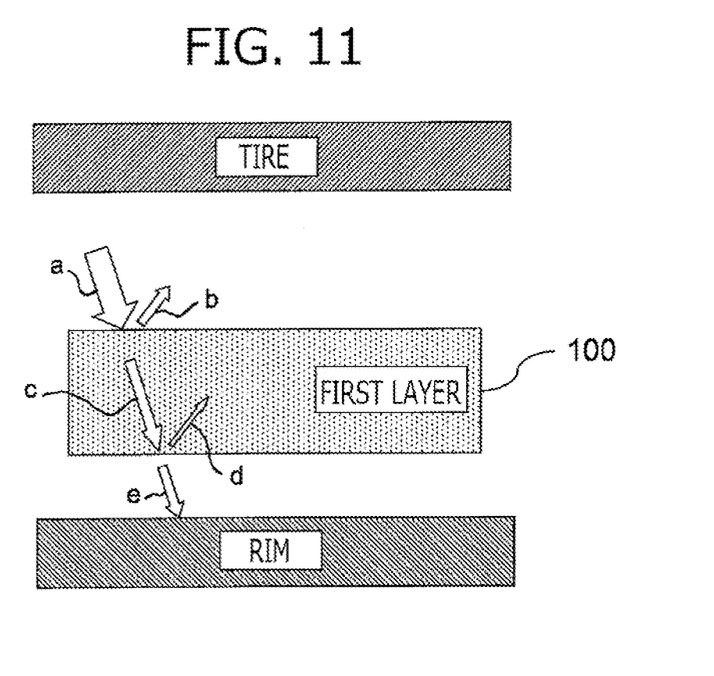
FIG. 11 is a conceptual diagram illustrating a configuration of a noise suppressing body of Comparative Example 1.
Figure 12:
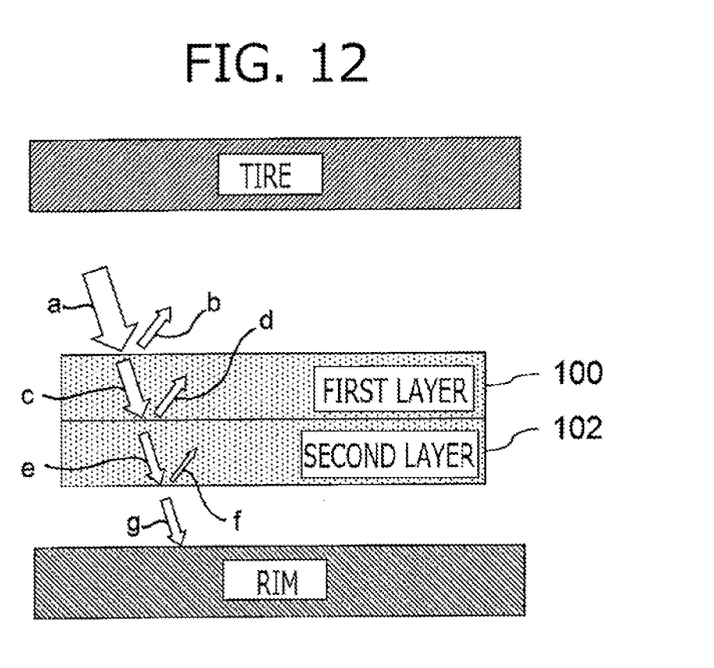
FIG. 12 is a conceptual diagram illustrating a configuration of a noise suppressing body of Comparative Example 2.
Figure 13:
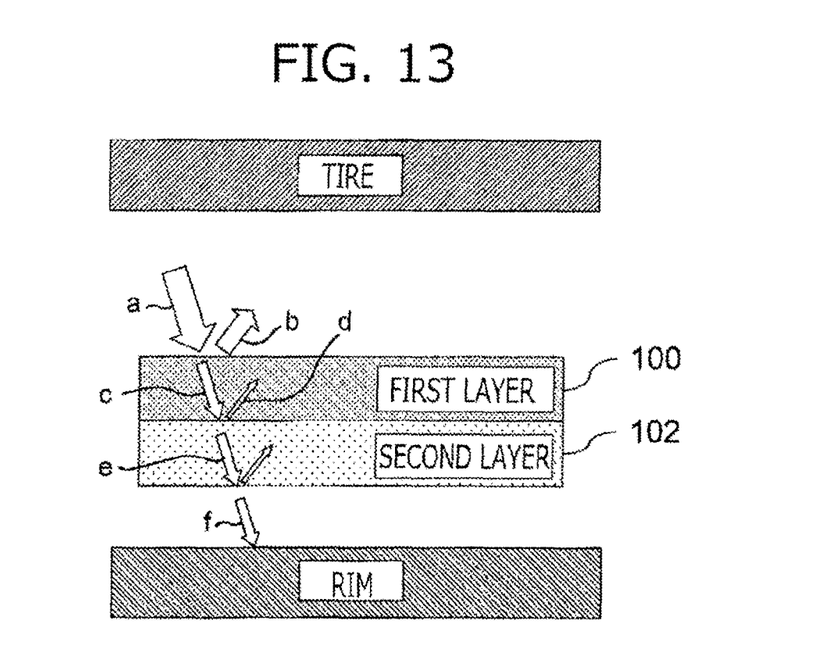
FIG. 13 is a conceptual diagram illustrating a configuration of a noise suppressing body of Comparative Example 3.

Comparative tests are performed on the assembly of the pneumatic fire 10 and the rim 12 which have the configuration of Embodiments 1 to 6, and an assembly in which a noise suppressing body of each configuration illustrated in FIGS. 11 to 13 is disposed as Comparative Examples 1 to 3. The specifications of each noise suppressing body in Embodiments and Comparative Examples are as illustrated in Table 1 below, and the other configurations except for the noise suppressing body are used in common. As the material for each sound absorbing material layer configuring the noise suppressing body, the non-woven fabrics are used for ail. In Embodiment 2, compared to the configuration in Embodiment 1, the first sound absorbing material layer 32 and the second sound absorbing material layer 34 are caused to have a non-adhesive interlayer therebetween, and the air layer 36 is disposed between both layers. In Embodiment 4, compared to the configuration in Embodiment 3, each interlayer of the first to third sound absorbing material layers 32, 34 and 38 is caused to be non-adhesive, and thereby the air layers 36 are disposed in each interlayer.

The size of the tire is set to 195/65R15 and the size of the rim is set to 15×6JJ. Then, the tire cavity 18 is filled with air pressure 200 kPa, and the noise suppressing effects are evaluated using the following method.

Noise Suppressing Effect: After tires (195/65R15) are mounted on a mini-van of 3,000 cc class and allowed to have predetermined air pressure, the mini-van travels on a test course at 60 km per hour. Then, a sound pressure is measured using a microphone attached to the ear position of the driver's seat window side. The sound pressure is compared by octave analysis using a power spectrum of 200 Hz to 200 Hz bandwidth. The comparison result is evaluated by the difference of dB from Comparative Example 1.

TABLE 1

| | | Comparative Example 1 | Comparative Example 2 | Comparative Example 3 | Embodiment 1 | Embodiment 2 | Embodiment 3 | Embodiment 4 | Embodiment 5 | Embodiment 6 |
|---|---|---|---|---|---|---|---|---|---|---|
| Configuration of Noise Suppressing Body | | FIG. 11 | FIG. 12 | FIG. 13 | FIG. 4 | FIG. 5 | FIG. 6 | FIG. 7 | FIG. 8 | FIG. 9 |
| Density ($kg/m^3$) | First Layer | 30 | 50 | 250 | 30 | 30 | 50 | 50 | 50 | 50 |
| | Second Layer | | 50 | 30 | 250 | 250 | 70 | 70 | 250 | 250 |
| | Third Layer | | | | | | 250 | 250 | 50 | 50 |
| | Fourth Layer | | | | | | | | | 250 |
| Thickness (mm) | First Layer | 10 | 5 | 0.2 | 10 | 10 | 5 | 5 | 5 | 5 |
| | Second Layer | | 5 | 10 | 0.2 | 0.2 | 5 | 5 | 0.2 | 0.2 |
| | Third Layer | | | | | | 0.2 | 0.2 | 5 | 5 |
| | Fourth Layer | | | | | | | | | 0.2 |
| Air Permeability ($cm^3/cm^2 \cdot sec$) | First Layer | 100 | 100 | 10 | 100 | 100 | 100 | 100 | 100 | 100 |
| | Second Layer | | 100 | 100 | 10 | 10 | 45 | 45 | 10 | 10 |
| | Third Layer | | | | | | 10 | 10 | 100 | 100 |
| | Fourth Layer | | | | | | | | | 10 |
| Noise Suppressing Effect (dB Difference) | | Control | 1.0 | 0.9 | 1.5 | 1.7 | 2.0 | 2.3 | 1.8 | 2.3 |

The result is as illustrated in Table 1. Compared to Comparative Example 1 having a noise suppressing body of a single layer, Comparative Example 2 has a noise suppressing body of a double layer structure and thereby the noise suppressing effect can be enhanced. However, the effect is insignificant. In detail, in Comparative Example 1, as illustrated in FIG. 11, a sound wave (a) transmitted from the tire becomes a reflection wave (b) on the surface of a first sound absorbing material layer 100 and an entry wave (c) to the first sound absorbing material layer 100. The entry wave (c) becomes a reflection wave (d) on the interface between the layer 100 and the gap, and a radiation wave (e) to the gap to be transmitted to the rim. In contrast, in Comparative Example 2, as illustrated in FIG. 12, the entry wave (c) becomes the reflection wave (d) on the interface between the first sound absorbing material layer 100 and a second sound absorbing material layer 102, and an entry wave (e) to the second sound absorbing material layer 102. Furthermore, the entry wave (e) becomes a reflection wave (f) on the interface between the layer 102 and the gap, and a radiation wave (g) to the gap to be transmitted to the rim. Therefore, compared to Comparative Example 1, the noise suppressing effect can be enhanced by generating the multiple reflections. However, since the air permeability of the first sound absorbing material layer 100 is the same as that of the second sound absorbing material layer 102 in Comparative Example 2, it cannot be described that there are sufficiently many components of the reflection wave (d) on the interface of both layers. Accordingly, the effect of the multiple reflections inside the noise suppressing body cannot be sufficiently obtained.

On the other hand, in Comparative Example 3, as illustrated in FIG. 13, the air permeability of the first sound absorbing material layer 100 is low. Accordingly, a sound save (a) transmitted from the tire has many components of a reflection wave (b) on the surface of the first sound absorbing material layer 100. In addition, an entry wave (c) to the first sound absorbing material layer 100 has fewer components of a reflection wave (d) on the interface with the second sound absorbing material layer 102, since the air permeability of the second sound absorbing material layer 102 is high. An entry wave (e) entering the second sound absorbing material layer 102 passes through the second sound absorbing material layer 102 and a radiation wave (f) radiated to the gap with the rim is transmitted to the rim. Therefore, the noise suppressing effect in Comparative Example 3 is inferior to that in Comparative Example 2.

In contrast, according to Embodiment 1, as illustrated in FIG. 4, the first sound absorbing material layer 32 has high air permeability and the sound wave is unlikely to be reflected thereon. Accordingly, it is possible to urge the sound wave to enter the noise suppressing body 26. In addition, since the air permeability of the second sound absorbing material layer 34 is low, the reflection occurs on the interface with the second sound absorbing material layer 34. Therefore, the sound absorbing effect is enhanced by the multiple reflections. According to Embodiment 2, the air layer 36 is further disposed and thereby the multiple reflections are further urged to obtain the excellent noise suppressing effect.

In addition, in Embodiment 3, by providing the air permeability with a difference in stages, the air permeability is gradually lowered. Accordingly, it is possible to urge the multiple reflections on the respective sound absorbing material layers 32, 34 and 38, and thereby it is possible to effectively absorb the sound. In addition, in Embodiment 4, the air layer 36 is further disposed. Accordingly, the multiple reflections are further urged to obtain the excellent noise suppressing effect.

In Embodiment 5, after the second sound absorbing material layer 34 having low air permeability is disposed at the rim side of the first sound absorbing material layer 32 having high air permeability, the third sound absorbing material layer 40 having high air permeability is disposed at the rim side of the second sound absorbing material layer 34. Accordingly, it is possible that the sound wave secondarily reflected on the rim is attenuated by the multiple reflections inside the noise suppressing body 26D, and thereby it is possible to enhance the noise suppressing effect, compared to Embodiment 1.

In Embodiment 6, the configuration of the noise suppressing body similar to that in Embodiment 1 is doubled. Accordingly, the sound absorbing effect is enhanced by the multiple reflections and the partition effect which does not transmit the sound to the rim is also enhanced. Therefore, compared to Embodiment 1, the noise suppressing effect is synergistically enhanced.

The invention can be adapted to various types of pneumatic tire, such as the pneumatic tire for passenger vehicles, the pneumatic tire for heavy duty vehicles such as trucks and buses, and the pneumatic tire for motorcycles.

What is claimed is:

1. An assembly of a pneumatic tire and a rim, comprising:
a rim;
a pneumatic tire mounted on the rim;
a tire cavity formed between the pneumatic tire and the rim; and
a noise suppressing body disposed inside the tire cavity and extending in a circumferential direction of the tire,
wherein the noise suppressing body comprises (i) a first sound absorbing material layer spaced from an inner surface of a tread part of the pneumatic tire with a cavity therebetween, and (ii) a second sound absorbing material layer disposed at the rim side of the first sound absorbing material layer and having lower air permeability than the first sound absorbing material layer, and
wherein the noise suppressing body has a gas layer between the first sound absorbing material layer and the second sound absorbing material layer.

2. An assembly of a pneumatic tire and a rim, comprising:
a rim;
a pneumatic tire mounted on the rim;
a tire cavity formed between the pneumatic tire and the rim; and
a noise suppressing body disposed inside the tire cavity and extending in a circumferential direction of the tire,
wherein the noise suppressing body comprises (i) a first sound absorbing material layer spaced from an inner surface of a tread part of the pneumatic tire with a gas-filled cavity therebetween, and (ii) a second sound absorbing material layer disposed at the rim side of the first sound absorbing material layer and having lower air permeability than the first sound absorbing material layer,
wherein the second sound absorbing material layer is formed of fiber structure materials or porous materials, and
wherein the noise suppressing body has a third sound absorbing material layer disposed at the rim side of the second sound absorbing material layer and having lower air permeability than the second sound absorbing material layer.

3. The assembly of the pneumatic tire and the rim according to claim 2, wherein the noise suppressing body is disposed annularly along an outer peripheral surface of the rim and non-adhesively, leaving a gap from the outer peripheral surface.

4. An assembly of a pneumatic tire and a rim, comprising:
a rim;
a pneumatic tire mounted on the rim;
a tire cavity formed between the pneumatic tire and the rim; and
a noise suppressing body disposed inside the tire cavity and extending in a circumferential direction of the tire,
wherein the noise suppressing body comprises (i) a first sound absorbing material layer spaced from an inner surface of a tread part of the pneumatic tire with a gas-filled cavity therebetween, and (ii) a second sound absorbing material layer disposed at the rim side of the first sound absorbing material layer and having lower air permeability than the first sound absorbing material layer,
wherein the second sound absorbing material layer is formed of fiber structure materials or porous materials, and
wherein the noise suppressing body has a third sound absorbing material layer disposed at the rim side of the second sound absorbing material layer and having higher air permeability than the second sound absorbing material layer.

5. The assembly of the pneumatic tire and the rim according to claim 4, wherein
the noise suppressing body has a fourth sound absorbing material layer disposed at the rim side of the third sound absorbing material layer and having lower air permeability than the third sound absorbing material layer.

6. The assembly of the pneumatic tire and the rim according to claim 4,
wherein the noise suppressing body is disposed annularly along an outer peripheral surface of the rim and non-adhesively, leaving a gap from the outer peripheral surface.

7. An assembly of a pneumatic tire and a rim, comprising:
a rim;
a pneumatic tire mounted on the rim;
a tire cavity formed between the pneumatic tire and the rim; and
a noise suppressing body disposed inside the tire cavity and extending in a circumferential direction of the tire,
wherein the noise suppressing body comprises (i) a first sound absorbing material layer spaced from an inner surface of a tread part of the pneumatic tire with a cavity therebetween, and (ii) a second sound absorbing material layer disposed at the rim side of the first sound absorbing material layer and having lower air permeability than the first sound absorbing material layer,
wherein the noise suppressing body has a third sound absorbing material layer disposed at the rim side of the second sound absorbing material layer and having lower air permeability than the second sound absorbing material layer, and
wherein the first sound absorbing material layer is formed of a resin film subjected to a perforating process, and the second sound absorbing material layer and the third sound absorbing material layer are formed of fiber structure materials or porous materials.

* * * * *